(12) United States Patent
Yoshida et al.

(10) Patent No.: US 9,625,283 B2
(45) Date of Patent: Apr. 18, 2017

(54) ENCODER HAVING LIGHT RECEIVING ELEMENTS, MOTOR WITH ENCODER, AND SERVO SYSTEM WITH ENCODER

(71) Applicant: KABUSHIKI KAISHA YASKAWA DENKI, Kitakyushu-shi (JP)

(72) Inventors: Yasushi Yoshida, Kitakyushu (JP); Yasuhiro Matsutani, Kitakyushu (JP); Shiro Yoshidomi, Kitakyushu (JP); Hiroshi Takada, Kitakyushu (JP); Yuji Arinaga, Kitakyushu (JP); Ikuma Murokita, Kitakyushu (JP); Masanobu Harada, Kitakyushu (JP); Hiroki Kondo, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 206 days.

(21) Appl. No.: 14/526,533

(22) Filed: Oct. 29, 2014

(65) Prior Publication Data

US 2015/0122982 A1    May 7, 2015

(30) Foreign Application Priority Data

Nov. 5, 2013   (JP) .................................. 2013-229833

(51) Int. Cl.
    *G01D 5/347*     (2006.01)
(52) U.S. Cl.
    CPC ....... *G01D 5/34792* (2013.01); *G01D 5/3473* (2013.01)

(58) Field of Classification Search
    CPC .................... G01D 5/3473; G01D 5/34792
    See application file for complete search history.

(56) References Cited

U.S. PATENT DOCUMENTS

| 4,912,322 A | 3/1990 | Ichikawa | |
|---|---|---|---|
| 5,563,408 A * | 10/1996 | Matsumoto | G01D 5/2455 250/231.14 |
| 2004/0007664 A1* | 1/2004 | Mitchell | G01D 5/38 250/237 G |

(Continued)

FOREIGN PATENT DOCUMENTS

| CN | 102636199 | 8/2012 |
|---|---|---|
| CN | 204461450 U | 7/2015 |

(Continued)

OTHER PUBLICATIONS

Office Action (Search Report and Written Opinion) for the corresponding Singapore Patent Application No. 102014072225 issued Feb. 5, 2015.

(Continued)

*Primary Examiner* — Francis M Legasse, Jr.
(74) *Attorney, Agent, or Firm* — Mori & Ward, LLP

(57) ABSTRACT

An encoder includes a track having optical effecters arranged to have an absolute pattern in a measurement direction, a light source configured to emit diffusion light to the track, and a light receiving array configured to have light receiving elements arranged in the measurement direction and to receive light reflected or transmitted by the track. The light receiving elements fall within an area which is positioned corresponding to an area between the optical effecters and to which the light reflected by the track dose not reach.

4 Claims, 10 Drawing Sheets

(56) References Cited

U.S. PATENT DOCUMENTS

| | | |
|---|---|---|
| 2004/0155178 A1 | 8/2004 | Ito |
| 2005/0157307 A1 | 7/2005 | Yamamoto et al. |
| 2005/0236560 A1 | 10/2005 | Ch'ng et al. |
| 2011/0155895 A1 | 6/2011 | Nagura |
| 2012/0205527 A1* | 8/2012 | Yoshida ................. G01D 5/145 |
| | | 250/231.1 |
| 2015/0122982 A1 | 5/2015 | Yoshida et al. |

FOREIGN PATENT DOCUMENTS

| | | |
|---|---|---|
| EP | 2487464 A2 | 8/2012 |
| JP | 07-280591 | 10/1995 |
| JP | 2002-013949 | 1/2002 |
| JP | 2005-156549 | 6/2005 |
| JP | 2006-084448 | 3/2006 |
| JP | 2010-066272 | 3/2010 |
| JP | 2011-185806 | 9/2011 |
| JP | 2012-103032 | 5/2012 |
| JP | 2012-167949 | 9/2012 |

OTHER PUBLICATIONS

Extended European Search Report for corresponding EP Application No. 14190671.9-1558, Mar. 6, 2015.
Chinese Office Action for corresponding CN Application No. 201410636025.0, Jul. 4, 2016 (w/ English machine translation).
Japanese Office Action for corresponding JP Application No. 2013-229833, Oct. 5, 2016.
Japanese Office Action for corresponding JP Application No. 2013-229833, Feb. 7, 2017.
Chinese Office Action for corresponding CN Application No. 201410636025.0, Jan. 22, 2017.

* cited by examiner

ENCODER HAVING LIGHT RECEIVING ELEMENTS, MOTOR WITH ENCODER, AND SERVO SYSTEM WITH ENCODER

INCORPORATION BY REFERENCE

The present disclosure contains subject matter related to that disclosed in Japanese Priority Patent Application JP 2013-229833 filed in the Japan Patent Office on Nov. 5, 2013, the entire contents of which are hereby incorporated by reference.

BACKGROUND

Field of the Invention

The embodiments disclosed herein relate to an encoder, a motor with an encoder, and a servo system.

Description of the Related Art

JP 2012-103032 A discloses a reflective encoder in which has a group of incremental light receiving elements that are divided and arranged across a light source in a circumferential direction of a rotary disk and a group of absolute light receiving elements that are arranged on at least one of outer and inner sides in a radial direction of the rotary disk relative to the light source.

In recent years, with the development of a servo system toward high performance, there is a desire to further improve detection accuracy in a reflective encoder.

SUMMARY

A one aspect of the present invention is summarized as an encoder including: a track having optical effecters arranged to have an absolute pattern along a measurement direction; a point light source configured to emit diffusion light to the track; and a light receiving array having light receiving elements arranged along the measurement direction, and configured to receive light reflected or transmitted at the track, the light receiving elements falling within an area which is positioned corresponding to an area between the optical effecters and to which light reflected or transmitted at the track dose not reach.

An another aspect of the present invention is summarized as a motor with the encoder including: a linear motor in which a movable element moves with respect to an stator, or a rotary motor in which a rotor moves with respect to an stator; and the encoder configured to detect at least one of a position and a speed of the movable element or the rotor.

An another aspect of the present invention is summarized as a servo system including: a linear motor in which a movable element moves with respect to an stator, or a rotary motor in which a rotor moves with respect to an stator; the encoder configured to detect at least one of a position and a speed of the movable element or the rotor; and a controller configured to control the linear motor or the rotary motor based on a result detected by the encoder.

An another aspect of the present invention is summarized as an encoder including: a track having optical effecters which are arranged to have an absolute pattern along a measurement direction and configured to reflect or transmit light; a point light source configured to emit diffusion light to the track, a light receiving array having light receiving elements arranged along the measurement direction, and configured to receive light reflected or transmitted at the track; means for falling the light receiving elements within an area which is positioned corresponding to an area between the optical effecters and to which light reflected or transmitted at the track dose not reach.

DESCRIPTION OF THE EMBODIMENTS

Hereinafter, an embodiment of the present invention will be described with reference to the drawings.

Furthermore, an encoder according to the embodiment to be described below is applicable to various types of encoders such as a rotary type and linear type. To facilitate understanding the encoder, the rotary type of encoder will be described below as an example. In the case of applying to another type of encoder, it is possible to make an appropriate change, for instance to change a measuring target from a rotary type of disk to a linear type of linear scale, and thus a detailed description thereof will not be presented.

<1. Servo System>

Figure 1:
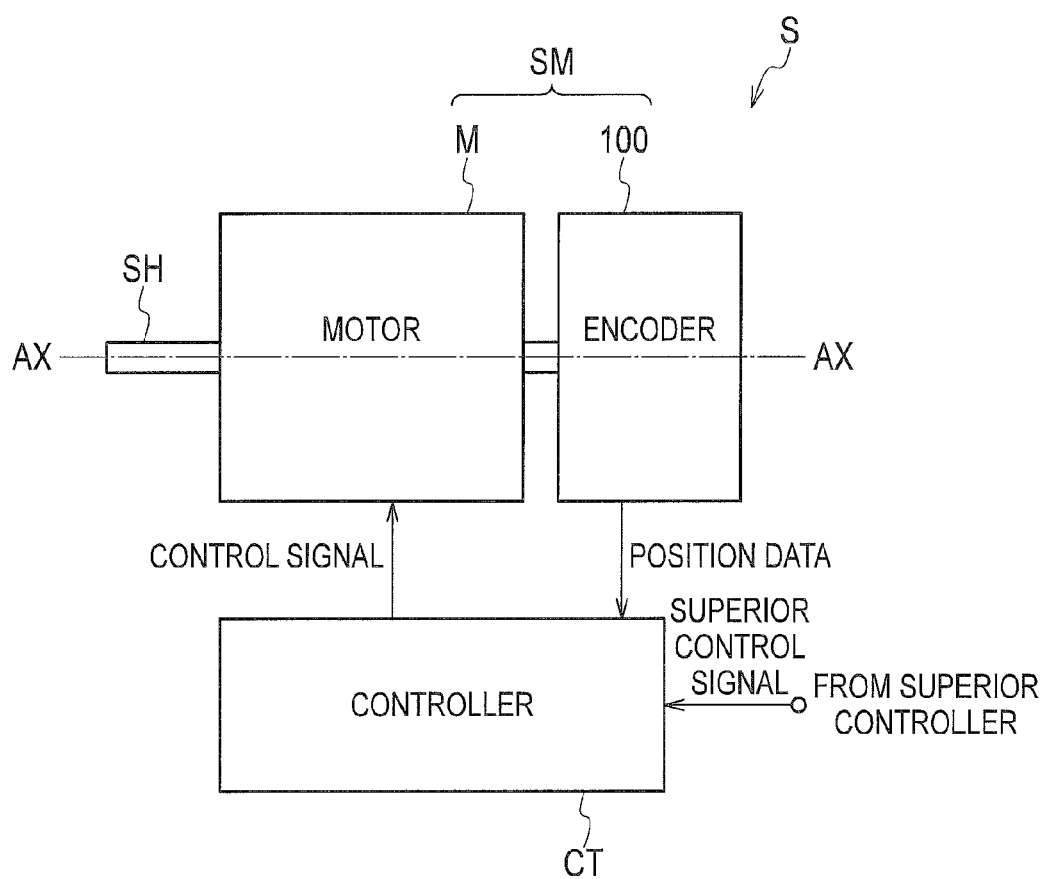
FIG. 1 is an explanatory diagram illustrating a servo system according to an embodiment.

First, a configuration of a servo system according to the present embodiment will be described with reference to FIG. 1. As illustrated in FIG. 1, the servo system S includes a servo motor SM and a controller CT. The servo motor SM includes an encoder 100 and a motor M.

The motor M is an example of a power source excluding the encoder 100. The motor M is a rotary motor in which a rotor (not illustrated) rotates relative to a stator (not illustrated) and outputs a rotational force by forcing a shaft SH fixed to the rotor to be rotated around a shaft center AX.

Further, the motor M alone may be referred to as a servo motor, but the configuration including the encoder 100 and the motor M is referred to as the servo motor SM in the present embodiment. That is, the servo motor SM corresponds to an example of a motor with an encoder. A case where the motor with the encoder is a servo motor which is controlled to follow a target value of a position, a speed or the like, is described below for convenience of description, but the motor with the encoder is not necessarily limited to the servo motor. For example, the motor with an encoder also includes a motor used except the servo system if the encoder is attached, for instance when the encoder is used only to display output.

Further, the motor M is not particularly limited, for instance, as long as position data thereof can be detected by the encoder 100. Further, the motor M is not limited to an electric motor that uses electricity as a power source, but it may be a motor that uses, for example, another power source, such as a hydraulic motor, an air motor, or a steam motor. However, for convenience of the following description, the motor M will be described as the electric motor.

The encoder 100 is connected to a side opposite to an output side of the rotational force of the shaft SH of the motor M, but it is not necessarily limited to the opposite side. The encoder 100 may be connected to the output side of the rotational force of the shaft SH. The encoder 100 detects a position (referred to also as a rotation angle) of the motor M by detecting a position of the shaft (rotor) SH, and outputs position data representing the position of the motor M.

The encoder 100 may detect at least one of a speed (referred to also as a rotation speed, an angular velocity, and like) of the motor M and an acceleration (referred to also as a rotation acceleration, an angular acceleration, and like) of the motor M in addition to or in place of the position of the motor M. In this case, it is possible to detect the speed and the acceleration of the motor M by, for example, processing such as a first or second order differential of the position with respect to time or a count of a detection signal (for example, an incremental signal to be described below) for a predetermined time. For convenience of the following description, the position will be described as a physical quantity detected by the encoder 100.

The controller CT acquires the position data output from the encoder 100 and controls the rotation of the motor M based on the acquired position data. Therefore, in the present embodiment in which the electric motor is used as the motor M, the controller CT controls a current or voltage to be applied to the motor M based on the position data, and thereby controls the rotation of the motor M. Further, the controller CT can also acquire a superior control signal from a superior controller (not illustrated), and control the motor M such that a rotational force capable of realizing a position or the like represented by the superior control signal is output from the shaft SH of the motor M. Furthermore, when the motor M uses another power source, such as a hydraulic power source, an air power source, or a steam power source, the controller CT may control the rotation of the motor M by controlling the supply from such a power source.

<2. Encoder>

Figure 2:
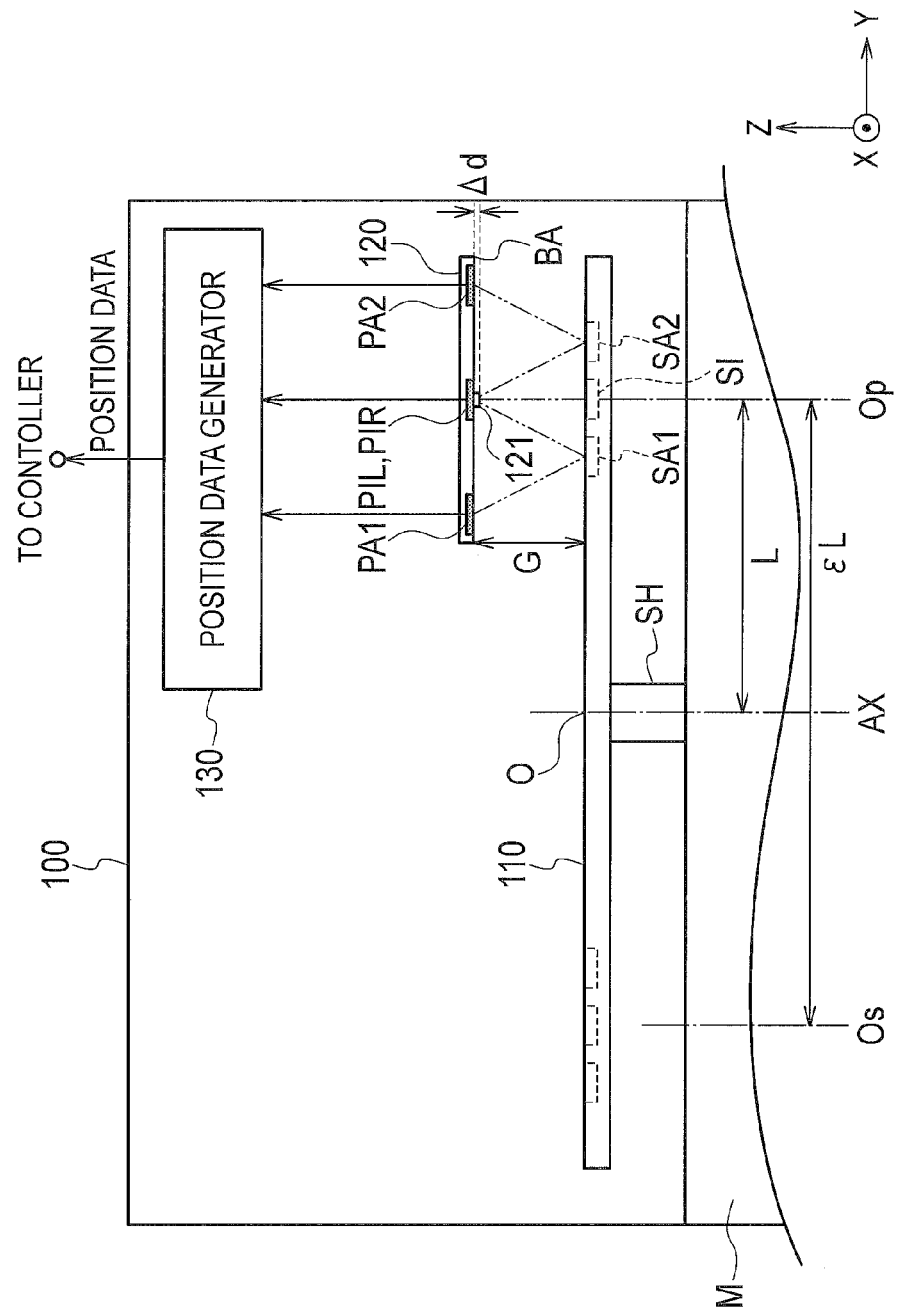
FIG. 2 is an explanatory diagram illustrating an encoder according to the embodiment.

The encoder 100 according to the present embodiment will be described below. As illustrated in FIG. 2, the encoder 100 has a disk 110, an optical module 120, and a position data generator 130.

Here, for convenience of description of a structure of the encoder 100, a direction such as an upward or downward direction is defined and appropriately used as follows. In FIG. 2, a direction in which the disk 110 faces the optical module 120, that is, a positive direction along the Z axis is referred to as an "upward" direction and a negative direction along the Z axis is referred to as a "downward" direction. However, the direction is changed depending on installation aspect of the encoder 100, and thus does not limit a positional relation of each component of the encoder 100.

(2-1. Disk)

Figure 3:
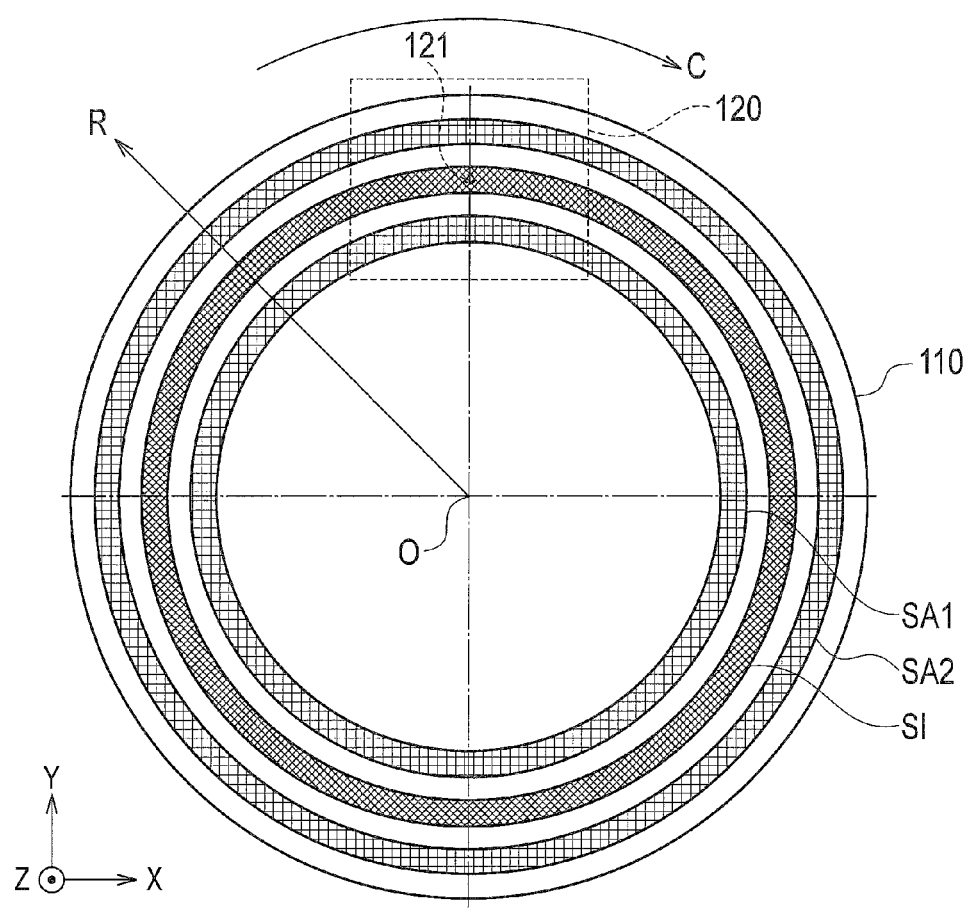
FIG. 3 is an explanatory diagram illustrating a disk according to the embodiment.

The disk 110 is formed into a circular plate shape as illustrated in FIG. 3, and is arranged such that the disk center O thereof substantially coincides with the shaft center AX. The disk 110 is connected to the shaft SH of the motor M, and is rotated by the rotation of the shaft SH. In the present embodiment, as a measuring target by which the rotation of the motor M is measured, the disk 110 of the circular-plate shape is described as an example. However, another member such as an end face of the shaft SH may also be used as the measuring target. In addition, the disk 110 is directly connected to the shaft SH in an example illustrated in FIG. 2, but it may be connected to the shaft SH via a connection member such as a hub.

As illustrated in FIG. 3, the disk 110 has a plurality of tracks SA1, SA2, and SI. The disk 110 is rotated as the motor M is driven, but the optical module 120 is fixedly arranged while being opposite to a part of the disk 110. Accordingly, as the motor M is driven, the tracks SA1, SA2, and SI and the optical module 120 move relative to each other in a measurement direction (that is a direction of the arrow C illustrated in FIG. 3 and is appropriately described below as a "measurement direction C").

Here, the "measurement direction" refers to a measurement direction when each of the tracks formed on the disk 110 is optically measured by the optical module 120. As in the present embodiment, in the rotary type of encoder in which measuring target is the disk 110, the measurement direction coincides with a circumferential direction centering on the central axis of the disk 110. However, for example, in the linear type of encoder in which the measuring target is a linear scale and in which a movable element moves relative to a stator, the measurement direction refers to a direction running along the linear scale. Further, the "central axis" refers to the center of a rotational axis of the disk 110 and coincides with the shaft center AX of the shaft SH when the disk 110 and the shaft SH are coaxially connected to each other.

(2-2. Optical Detection Mechanism)

An optical detection mechanism has the tracks SA1, SA2, and SI and the optical module 120. Each of the tracks is formed as a track arranged on the top surface the disk 110 in the shape of a ring centering on the disk center O. Each of the tracks has a plurality of optical effecters (parts hatched by oblique lines in FIG. 4) arranged in the measurement direction C over the entire circumference of the track. In the present embodiment, each of the optical effecters is configured to reflect light irradiated from a light source 121. The optical effecter is configured to reflect or transmit light. In the present embodiment, the optical effecter is configured to reflect light. The optical effecter can be called as a "slit (reflect slit or transmissive slit)", because the light reflected or transmitted at the optical effecter travels a predetermined direction without obstructing the path of the light. Moreover, a plurality of optical effecters can be a grid as a whole.

(2-2-1. Disk)

The disk 110 is formed of a material such as a metal which reflects light. Then, a material having a low reflectance (for example, chromium oxide) is applied to and arranged at parts of the surface of the disk 110 wherein the parts reflect no light, and thereby the optical effecters are formed at parts at which the material is not arranged. Further, the parts that reflect no light may be turned into a rough surface by, for instance, sputtering, and be reduced in the reflectance. Thereby, the optical effecters may be formed at the parts.

Further, the material of the disk 110 and a manufacturing method thereof are not particularly limited. For example, the disk 110 may be formed of a light transmitting material such as a glass or a transparent resin. In this case, a light reflecting material (for example, aluminum) may be arranged on the surface of the disk 110 by, for instance, deposition, and thereby the optical effecters may be formed.

Three tracks are juxtaposed in a width direction (that is a direction of the arrow R illustrated in FIG. 3 and is appropriately described below as a "width direction R") on the top surface of the disk 110. Further, the "width direction" refers to a radial direction of the disk 110, that is, a direction approximately perpendicular to the measurement direction C. A length of each track in the width direction R corresponds to a width of each track. The three tracks are concentrically arranged in the order of SA1, SI, and SA2 from inside to outside in the width direction R. In order to describe each track in greater detail, a partially enlarged view of a surrounding area that is opposite to the optical module 120 of the disk 110 is illustrated in FIG. 4.

Figure 4:
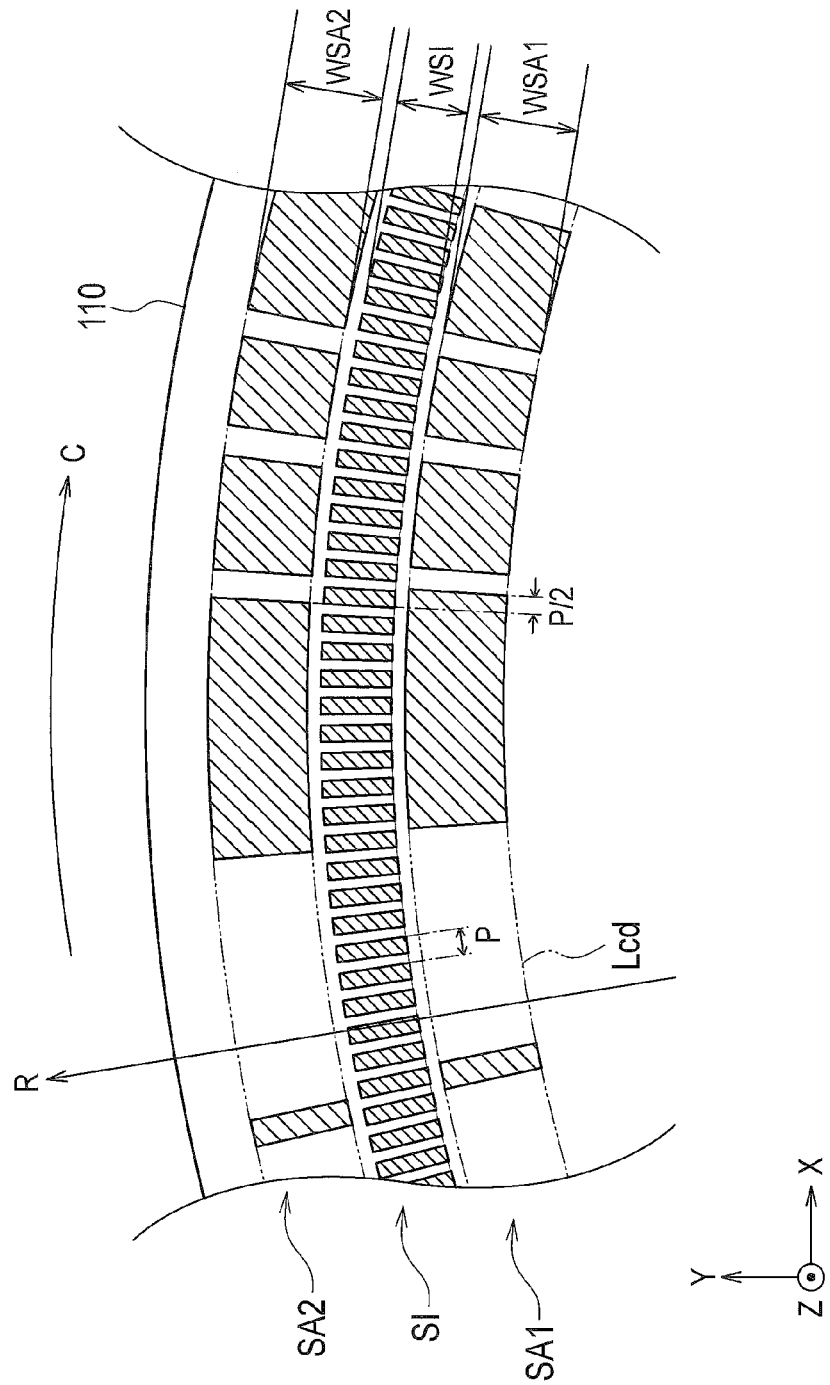
FIG. 4 is an explanatory diagram illustrating a track according to the embodiment.

As illustrated in FIG. 4, the plurality of optical effecters provided for the tracks SA1 and SA2 are arranged over the entire circumference of the disk 110 so as to have an absolute pattern in the measurement direction C.

Furthermore, the "absolute pattern" refers to a pattern in which a position or a proportion of each optical effecter within an angle at which light receiving arrays provided for the optical module 120 to be described below face each other is determined unambiguously within one rotation of the disk 110. That is, for example, in the case of an example of the absolute pattern illustrated in FIG. 4, when the motor M is located at a certain angular position, a combination of bit patterns by detection or no detection of a respective plurality of light receiving elements of the light receiving arrays facing each other unambiguously represents an absolute position of the angular position. Further, the "absolute position" refers to an angular position relative to an original point within one rotation of the disk 110. The original point is set to an appropriate angular position within one rotation of the disk 110, and the absolute pattern is formed on the basis of the original point.

Furthermore, according to an example of this pattern, it is possible to generate a pattern which one-dimensionally represents the absolute position of the motor M by bits in the number of light receiving elements of the light receiving array. However, the absolute pattern is not limited to such an example. For example, the absolute pattern may be a pattern which is multi-dimensionally represented by the bits in the number of the light receiving elements. Further, in addition to the predetermined bit patterns, the absolute pattern may be a pattern changed such that a physical quantity such as a quantity or phase of light received by the light receiving elements unambiguously represents the absolute position, a pattern which a code sequence of the absolute pattern modulates, or other various patterns.

Further, in the present embodiment, the same absolute patterns are offset by, for example, a half of the length of the one bit in the measurement direction C, and are formed as the two tracks SA1 and SA2. The offset amount is equivalent to, for example, a half of a pitch P of the optical effecter of the track SI. Supposing that the tracks SA1 and SA2 are not configured to be offset, there is a possibility as follows. That is, when the absolute position is represented by the one-dimensional absolute pattern as in the present embodiment, the light receiving elements of the light receiving arrays PA1 and PA2 are located so as to be opposite to each other in the vicinity of the end of the optical effecter, and thus detection accuracy of the absolute position may be reduced in a change area of the bit pattern. In the present embodiment, since the tracks SA1 and SA2 are offset, for example, when the absolute position according to the track SA1 corresponds to the change of the bit pattern, the absolute position is calculated using a detection signal from the track SA2, or the reverse is performed, and thus the detection accuracy of the absolute position can be improved. Further, in the case of this configuration, it is necessary to make an amount of received light in the two light receiving arrays PA1 and PA2 uniform. However, in the present embodiment, the two light receiving arrays PA1 and PA2 are arranged at the same distance from the light source 121, and thus it is possible to realize the above configuration.

Furthermore, instead of offsetting the respective absolute patterns of the tracks SA1 and SA2, for example, the light receiving arrays PA1 and PA2 corresponding to the respective tracks SA1 and SA2 may be offset without offsetting the absolute patterns.

On the other hand, the plurality of optical effecters provided for the tracks SI are arranged over the entire circumference of the disk 110 so as to have an incremental pattern in the measurement direction C.

The "incremental pattern" refers to a pattern repeated regularly at a predetermined pitch as illustrated in FIG. 4. Here, the "pitch" refers to an arrangement interval of each optical effecter in the track SI having the incremental pattern. As illustrated in FIG. 4, the pitch of the track SI is P. Unlike the absolute pattern which represents the absolute positions as the bits corresponding to whether or not detected by the plurality of light receiving elements, the incremental pattern represents the position of the motor M at each pitch or within one pitch by the sum of detection signals of at least one or more light receiving elements. Accordingly, the incremental pattern does not represent the absolute position of the motor M, but it can represent the position with very high accuracy compared to the absolute pattern.

In the present embodiment, a minimum length of the optical effecters of the tracks SA1 and SA2 in the measurement direction C is identical to the pitch P of the optical effecters of the track SI. As a result, a resolution of the absolute signal based on the tracks SA1 and SA2 is consistent with the number of optical effecters of the track SI. However, the minimum length is not limited to such an example, and the number of optical effecters of the track SI is preferably set to be equal to or more than the resolution of the absolute signal.

(2-2-2. Optical Module)

Figure 5:
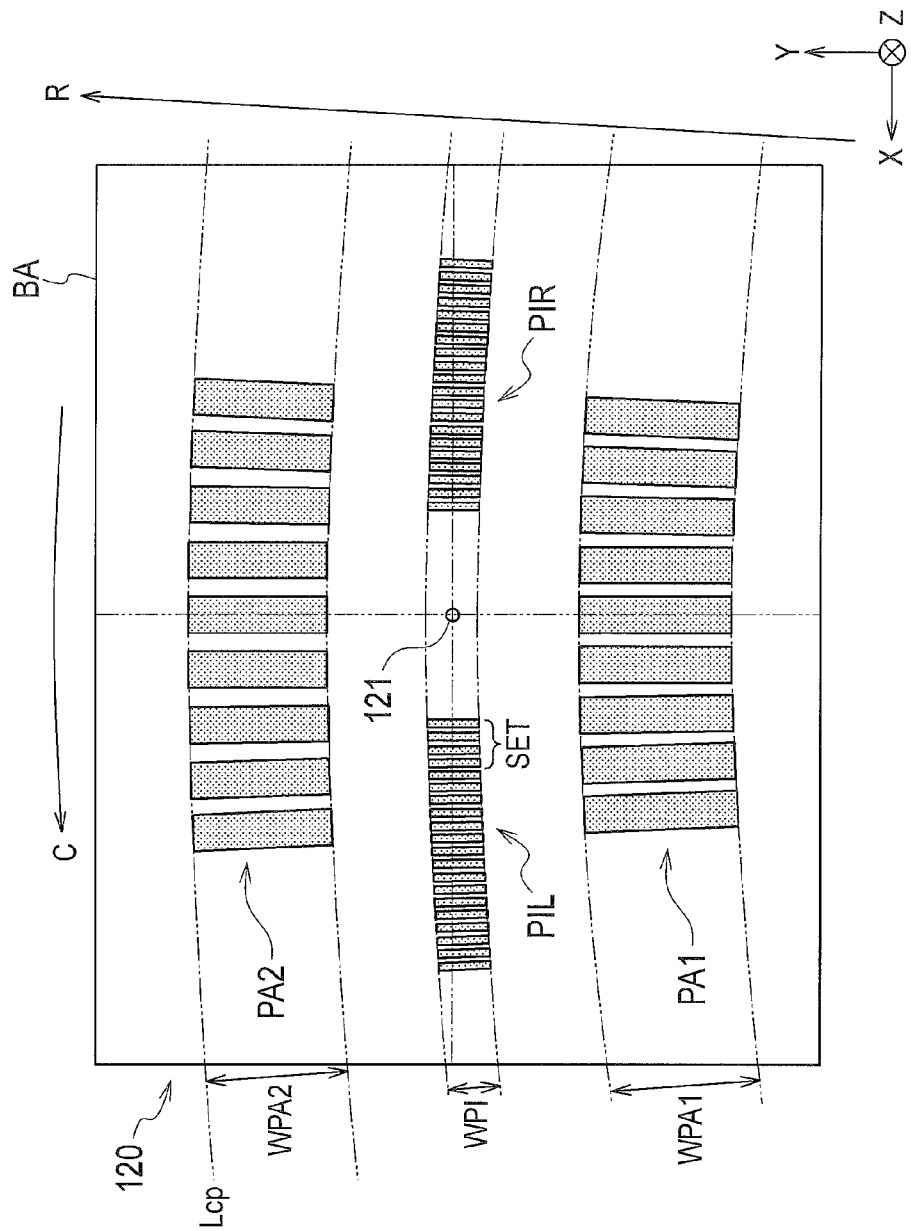
FIG. 5 is an explanatory diagram illustrating an optical module and a light receiving array according to the embodiment.

As illustrated in FIGS. 2 and 5, the optical module 120 is formed as one substrate BA parallel to the disk 110. Thereby, the encoder 100 can be made thinner, or the optical module 120 can be easily manufactured. Therefore, as the disk 110 is rotated, the optical module 120 relatively moves in the measurement direction C with respect to the tracks SA1, SA2, and SI. Further, the optical module 120 is not necessarily configured as one substrate BA, but each component may be configured as multiple substrates. In this case, these substrates may be collectively arranged. In addition, the optical module 120 may not be configured in the form of substrate.

As illustrated in FIGS. 2 and 5, the optical module 120 includes the light source 121 and the plurality of light receiving arrays PA1, PA2, PIL, and PIR on the surface of the substrate BA which faces the optical disk 110.

As illustrated in FIG. 3, the light source 121 is arranged at a position facing the track SI1 on a surface facing the disk 110 of the substrate BA. Then, the light source 121 emits light to three tracks SA1, SA2, and SI passing through positions facing the optical module 120 on a surface facing the substrate BA of the disk 110.

The light source 121 is not particularly limited as long as it can irradiate an irradiation area with light. For example, it is possible to use a light emitting diode (LED). The light source 121 is particularly configured as a point light source in which no optical lens is arranged, and emits diffusion light from a light emitting unit. Further, in the case of the "point light source," the light source does not need to be strictly a point. Light may be emitted from a finite emitting surface as long as the light source is regarded as a light source capable of emitting diffusion light from an approximately point-like position from the standpoint of design and operation principle. In addition, the "diffusion light" is not limited to light emitted toward all directions from the point light source, but includes light emitted while diffusing toward a finitely certain orientation. That is, the diffusion light described herein includes light having higher diffusivity than parallel light. By using the point light source as described above, it is possible for the light source 121 to substantially uniformly irradiate the three tracks SA1, SA2, and SI passing through the positions facing the optical module 120 on a surface facing the substrate BA of the disk 110. Further, in the embodiment, since the light is not collected and diffused by the optical element, errors are unlikely to occur due to the optical element, and thus it is possible to improve straightness of light toward the tracks.

The plurality of light receiving arrays are arranged around the light source 121 and include a plurality of light receiving elements (dot hatched parts in FIG. 5) for respectively receiving light reflected by the optical effecters of the tracks corresponding thereto. As illustrated in FIG. 5, the plurality of light receiving elements are arranged in the measurement direction C.

The light emitted from the light source 121 is diffusion light. Accordingly, images of the tracks projected onto the optical module 120 are images magnified by a predetermined magnification percentage $\epsilon$ according to an optical path length. That is, as illustrated in FIGS. 4 and 5, when it is assumed that respective lengths of the tracks SA1, SA2, and SI in the width direction R are WSA1, WSA2, and WSI and lengths of the shapes of the reflected lights projected onto the optical module 120 in the width direction R are WPA1, WPA2, and WPI, the WPA1, WPA2, and WPI become E times WSA1, WSA2, and WSI. In the present embodiment, as illustrated in FIG. 5, the respective lengths of the light receiving elements of the light receiving arrays in the width direction R are set to be substantially equal to the respective shapes of the optical effecters projected onto the optical module 120 as an example. However, the lengths of the light receiving elements in the width direction R are not necessarily limited to such an example.

Similarly, the shape of the measurement direction C in the optical module 120 is also a shape in which the measurement direction C in the disk 110 is projected onto the optical module 120, that is, a shape affected by the magnification percentage E. In order to make understanding easier, as illustrated in FIG. 2, the measurement direction C at the position of the light source 121 is described in detail as an example. The measurement direction C in the disk 110 has a circular shape centering on the shaft center AX. In contrast, the center of the measurement direction C projected onto the optical module 120 is located at a position separated from an optical center Op, which is located within the plane of the disk 110 on which the light source 121 is arranged, by a distance $\epsilon L$. The distance $\epsilon L$ means that a distance L between the shaft center AX and the optical center Op is magnified by the magnification percentage $\epsilon$. This position is conceptually illustrated as a measurement center Os in FIG. 2. Accordingly, the measurement direction C in the optical module 120 is on a line that centers on the measurement center Os, which is separated from the optical center Op by the distance $\epsilon L$ in the direction of the shaft center AX on a line on which the optical center Op and the shaft center AX are located, and that takes the distance $\epsilon L$ as a radius.

In FIGS. 4 and 5, respective correspondence relations of the measurement direction C in the disk 110 and the optical module 120 are represented by arc-like lines Lcd and Lcp. The line Lcd illustrated in FIG. 4 represents a line running in the measurement direction C on the disk 110, whereas the line Lcp illustrated in FIG. 5 represents a line (a line by which the line Lcd is projected onto the optical module 120) running in the measurement direction C on the substrate BA.

As illustrated in FIG. 2, when it is assumed that a gap length between the optical module 120 and the disk 110 is G and that an amount of protrusion of the light source 121 from the substrate BA is $\Delta d$, the magnification percentage is expressed as follows (Formula 1).

$$\epsilon = (2G - \Delta d)/(G - \Delta d) \quad \text{(Formula 1)}$$

For example, a photodiode may be used as each light receiving element. However, the light receiving element is not limited to the photodiode. That is, the light receiving element is not particularly limited as long as it can receive the light emitted from the light source 121 and convert the received light into an electric signal.

In the present embodiment, the light receiving arrays are arranged corresponding to the three tracks SA1, SA2, and SI. The light receiving array PA1 is configured to receive light reflected by the track SA1, and the light receiving array PA2 is configured to receive light reflected by the track SA2. In addition, the light receiving arrays PIL and PIR are configured to receive light reflected by the track SI. The light receiving arrays PIL and PIR are divided halfway, but correspond to the same track. In this way, the light receiving array corresponding to one track is not limited to one, but it may be multiple.

The light source 121, the light receiving arrays PA1 and PA2, and the light receiving arrays PIL and PIR are arranged in a positional relation illustrated in FIG. 5. The light receiving arrays PA1 and PA2 corresponding to the absolute pattern are arranged across the light source 121 in the width direction R. In this example, the light receiving array PA1 is arranged at an inner circumferential side, and the light receiving array PA2 is arranged at an outer circumferential side. In the present embodiment, a distance between the light source 121 and the light receiving array PA1 is approximately equal to that between the light source 121 and the light receiving array PA2. Then, the plurality of light receiving elements provided for the light receiving arrays PA1 and PA2 are respectively arranged in the measurement direction C (along the lines Lcp) at a fixed pitch. The light receiving arrays PA1 and PA2 receive the light reflected from the respective tracks SA1 and SA2, and thus the absolute signal having the bit pattern corresponding to the number of light receiving elements is generated.

The light receiving arrays PIL and PIR corresponding to the incremental pattern are arranged across the light source 121 in the measurement direction C. To be specific, the light receiving arrays PIL and PIR are arranged to be line symmetry using a line parallel to the Y axis including the light source 121 as an axis of symmetry. Each of the light receiving arrays PA1 and PA2 has a shape of line symmetry with respect to the axis of symmetry. The light source 121 is arranged between the light receiving arrays PIL and PIR arranged as one track in the measurement direction C.

In the present embodiment, since the one-dimensional pattern is exemplified as the absolute pattern, the light receiving arrays PA1 and PA2 corresponding thereto include the plurality of light receiving elements (for example, nine light receiving elements in the present embodiment) arranged in the measurement direction C (along the line Lcp) so as to receive the light reflected by the respective optical effecters of the corresponding tracks SA1 and SA2. In the plurality of light receiving elements, as described above, each signal of received or unreceived light is handled as a bit, and the absolute positions of nine bits are represented. Accordingly, the signals of light received by the respective plurality of light receiving elements are handled independently of one another at the position data generator 130, and the absolute positions encrypted (coded) into a serial bit pattern are decoded from a combination of these received light signals. The received light signals of the light receiving arrays PA1 and PA2 are referred to as "absolute signals." Further, when the absolute pattern different from that of the present embodiment is used, the light receiving arrays PA1 and PA2 are configured corresponding to such a pattern.

The light receiving arrays PIL and PIR include the plurality of light receiving elements arranged in the measurement direction C (along the line Lcp) so as to receive the light reflected by the optical effecters of the corresponding track SI.

In the present embodiment, within one pitch (one pitch in the projected image, that is, ϵ×P) of the incremental pattern of the track SI, a set (indicated as "SET" in FIG. 5) of four light receiving elements in all are arranged, and multiple sets of four light receiving elements are further arranged in the measurement direction C. Then, in the incremental pattern, the optical effecter is repeatedly formed at every pitch. Thus, when the disk 110 is rotated, each of the light receiving elements generates a periodic signal of one period (referred to as 360° in terms of electric angle) at one pitch. Then, since the four light receiving elements are arranged within one set corresponding to one pitch, the light receiving elements adjacent to each other within one set detect periodic signals having a phase difference of 90° from each other. These received light signals are respectively referred to as an A-phase signal, a B-phase signal (phase difference from the A-phase signal is 90°), an inverted A-phase signal (phase difference from the A-phase signal is 180°), and an inverted B-phase signal (phase difference from the B-phase signal is 180°).

Since the incremental pattern represents a position in one pitch, the signal of each phase in one set and the signal of each phase in another set corresponding thereto have values that change in the same manner. Accordingly, the signals of the same phase are added over a plurality of sets. Therefore, four signals having the phase shifted by 90° are detected from a number of light receiving elements of the light receiving array PI illustrated in FIG. 5. Therefore, four signals having the phase shifted by 90° are generated from the light receiving arrays PIL and PIR. These four signals are referred to as "incremental signals."

In the present embodiment, the four light receiving elements are included in one set corresponding to one pitch of the incremental pattern, and each of the light receiving arrays PIL and PIR has the set of the same configuration. This configuration will be described as an example. However, for example, the two light receiving elements are included in one set, and the number of light receiving elements within one set is not particularly limited. Further, the light receiving arrays PIL and PIR may be configured to obtain the received light signals of different phases.

(2-3. Position Data Generator)

From the optical module 120, the position data generator 130 acquires two absolute signals, each of which includes the bit pattern representing the absolute position, and incremental signals, which include the four signals having the phase shifted by 90°, at a timing to measure the absolute position of the motor M. Then, the position data generator 130 calculates the absolute position of the motor M represented by these signals based on the acquired signals, and outputs position data representing the calculated absolute position to the controller CT.

A method for generating the position data using the position data generator 130 may use various methods, and is not particularly limited. Here, the case of calculating the absolute position from the incremental signals and the absolute signals to generate the position data will be described as an example.

The position data generator 130 binarizes each of the absolute signals from the light receiving arrays PA1 and PA2, and converts the binarized signal into bit data representing the absolute position. Then, the position data generator 130 specifies the absolute position based on a correspondence relation between predetermined bit data and the absolute position. On the other hand, the position data generator 130 performs subtraction on the incremental signals having a phase difference of 180° among the incremental signals having the four phases from the light receiving arrays PIL and PIR. By performing the subtraction on any signals between which the phase difference is 180° in this way, it is possible to cancel out manufacture errors or measurement errors of the optical effecter within one pitch. The signals resulting from the subtraction as described above are referred to herein as a "first incremental signal" and a "second incremental signal." The first incremental signal and the second incremental signal have a phase difference of 90° from each other in terms of an electric angle (simply referred to as the "A-phase signal" and the "B-phase signal"). Therefore, the position data generator 130 specifies a position within one pitch from the two signals. A method of specifying the position within one pitch is not particularly limited. For example, when the incremental signals, which are periodic signals, are sinusoidal signals, as an example of the above specifying method, there is a method of calculating an electric angle ϕ by performing an arctangent operation on the result of division of the two A-phase and B-phase sinusoidal signals. Further, there is also a method of converting the two sinusoidal signals into electric angles ϕ using a tracking circuit, as an example of the above specifying method. Alternatively, there is also a method of specifying electric angles ϕ mapped to values of A-phase and B-phase signals in a table prepared in advance, as an example of the above specifying method. At this time, the position data generator 130 preferably performs analog-digital conversion on the two A-phase and B-phase sinusoidal signals for each detection signal.

The position data generator 130 overlaps the absolute position specified based on the absolute signal and the position within one pitch specified by the incremental signal. Thereby, it is possible to calculate an absolute position having a higher resolution than the absolute position based on the absolute signal. The position data generator 130 multiplies the absolute position calculated in this way to further improve a resolution, and then outputs the absolute position to the controller CT as position data representing a highly accurate absolute position.

(2-4. Relation Between Light Source Width and Light Receiving Element Width)

In the present embodiment, a width φ of an emitting surface of the light source 121 in the measurement direction (hereinafter referred to simply as a "light source width φ") and a width x of each light receiving element of the light receiving arrays PA1 and PA2 in the measurement direction (hereinafter referred to simply as a "light receiving element width x") are set to have a predetermined relation, and details thereof will be described.

Figure 6:
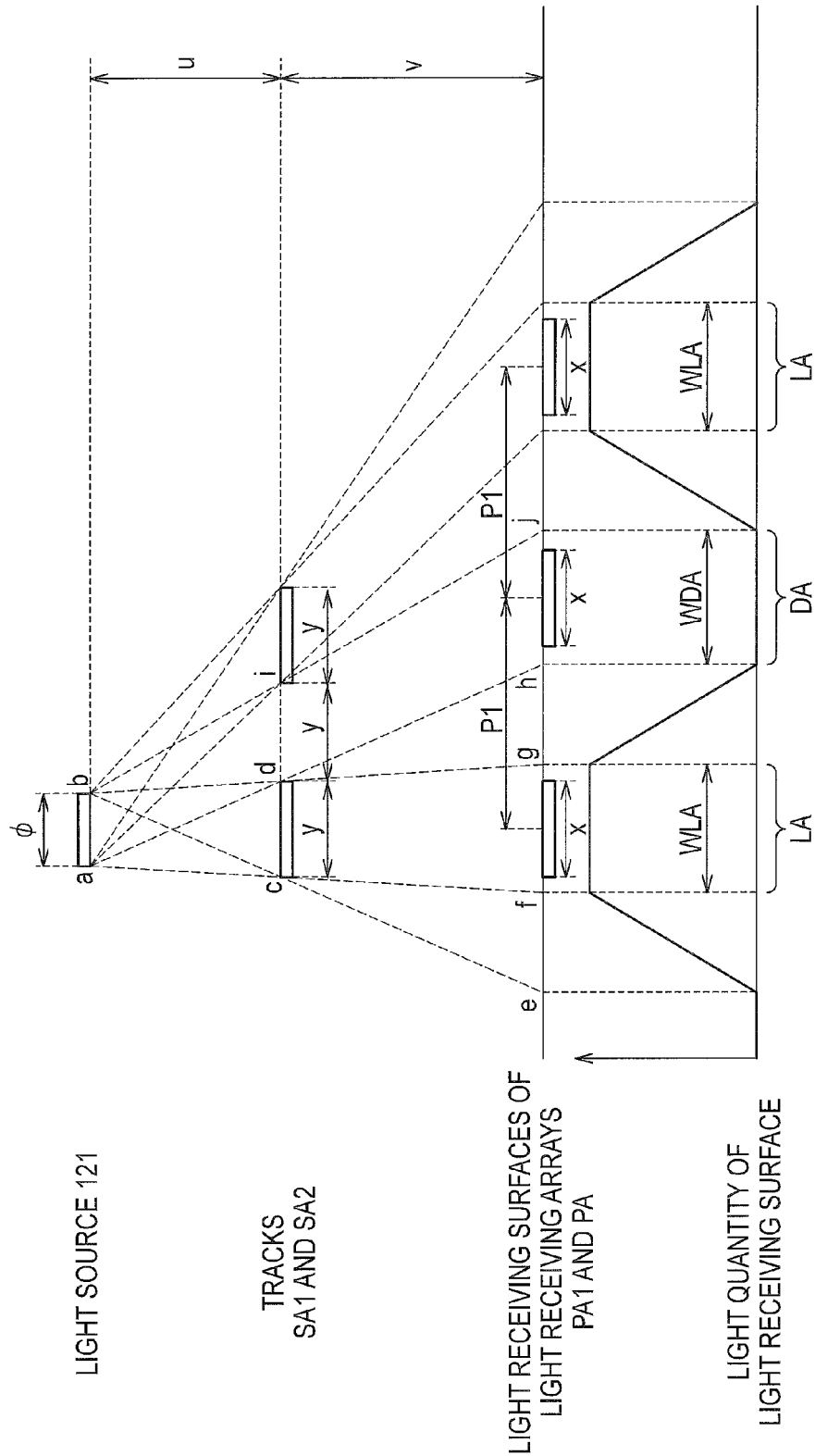
FIG. 6 is an explanatory diagram illustrating a relation among a light source width, an optical effecter width, a light receiving element width, and a quantity of light on a light receiving surface.

FIG. 6 is a view illustrating a relation among a light source width φ, a minimum width y of each optical effecter of the tracks SA1 and SA2 in the measurement direction (hereinafter referred to simply as an "optical effecter width y"), a light receiving element width x, and a quantity of light on a light receiving surface. In FIG. 6, for convenience of description, the light reflected by the optical effecters is shown in a transmitted mode. Further, each optical effecter of the tracks SA1 and SA2 is actually configured to be present or not at each minimum width y (equal to the pitch P of the track SI), and is thereby formed to be a predetermined bit pattern in the measurement direction. Here, for convenience of description, the optical effecter width y are shown in a mode in which they are adjacent to each other at an interval y.

The light source 121 typically becomes a light source having a finite emitting area rather than a complete ideal point light source. For this reason, as illustrated in FIG. 6, a quantity of received light on the light receiving surface of the light that is emitted from the light source 121 and is reflected by the tracks SA1 and SA2 of the disk 110 is reduced at boundary parts (opposite ends of the measurement direction), and has trapezoidal distribution with respect to all the optical effecters. Here, an area having a maximum quantity of light on the light receiving surface is defined as a light area LA, and an area which is positioned corresponding to an area between the optical effecters and to which the light reflected by the tracks SA1 and SA2 does not reach is defined as a dark area DA. Widths of the light and dark areas LA and DA in the measurement direction C are defined as WLA and WDA, respectively.

The width WLA of the light area LA can be expressed as follows. As illustrated in FIG. 6, a triangle acd (hereinafter described simply as "Δacd," and equally applied to other triangles) and Δafh are similar to each other. Thereby, $y:fh=u:u+v$, and $fh=\{y\times(u+v)\}/u$. On the other hand, Δdba and Δdgh are similar to each other. Thereby, $\phi:gh=u:v$, and $gh=(\phi\times v)/u$. Consequently, $WLA=fh-gh=\{y\times(u+v)\}/u-(\phi\times v)/u=\{y\times(u+v)-\phi\times v\}/u$. Here, u is an interval between the emitting surface of the light source 121 and the reflective surface (surface of the disk 110) of the track SA1 or SA2, and v is an interval between the reflective surface of the track SA1 or SA2 and the light receiving surface of the light receiving array PA1 or PA2.

Meanwhile, the width WDA of the dark area DA can be expressed as follows. As illustrated in FIG. 6, Δbdi and Δbgj are similar to each other. Thereby, $y:gj=u:u+v$, and $gj=\{y\times(u+v)\}/u$. On the other hand, as described above, Δdba and Δdgh are similar to each other, and thereby $gh=(\phi\times v)/u$. Consequently, $WDA=gj-gh=\{y\times(u+v)\}/u-v/u=\{y\times(u+v)-\phi\times v\}/u$. That is, the width WLA of the light area LA is equal to width WDA of the dark area DA.

Here, in the present embodiment, the light receiving elements of the light receiving array PA1 or PA2 fall within the dark area DA, and thus the light receiving element width x is within the width WDA of the dark area DA. In the other hands, the encoder 100 includes means for falling the light receiving elements within the dark area DA. To be concrete, the light source width φ and the light receiving element width x can be set so that the light receiving elements of the light receiving array PA1 or PA2 fall within the dark area DA. That is, when u≠v, the light source width φ and the light receiving element width x can be set to satisfy a relational expression of $x \le \{y\times(u+v)-\phi\times v\}/u$. If this expression is arranged for the light source width φ, then $\phi \le \{y\times(u+v)-u\times x\}/v$. The pitch P1 of each light receiving element has a distance at which the pitches 2y of the optical effecters are enlarged by the magnification percentage $\epsilon$ ($\epsilon=(u+v)/u$ in the example illustrated in FIG. 6). Thereby, as the track SA1 and SA2 moves, the light receiving element can be adapted to fall into both of the light area LA and the dark area DA. As a result, the output of the detection signal can be maximized in the light area LA, and be minimized in the dark area DA. As such, it is possible to increase an amplitude of the detection signal to improve detection accuracy.

In the present embodiment, as illustrated in FIG. 2, the gap length between the optical module 120 and the disk 110 is G, and the amount of protrusion of the light source 121 from the substrate BA is Δd, and thus u=G−Δd, and v=G. In contrast, if Δd is small enough to be neglected, then u=v (=G). The above relational expression can become $x \le 2\times y-\phi$ or $\phi \le 2\times y-x$. Further, in this case, when the light receiving element width x and the optical effecter width y are equal to each other, the above relational expression becomes $y \ge \phi$ or $\phi \le y$.

<3. Examples of Effects Produced by the Present Embodiment>

In the present embodiment, as described above, since the light source width φ and the light receiving element width x are set such that the light receiving elements of the light receiving array PA1 or PA2 fall within the dark area DA, it is possible to increase the amplitude of the detection signal of the light receiving array PA1 or PA2 to improve the detection accuracy.

Figure 7:
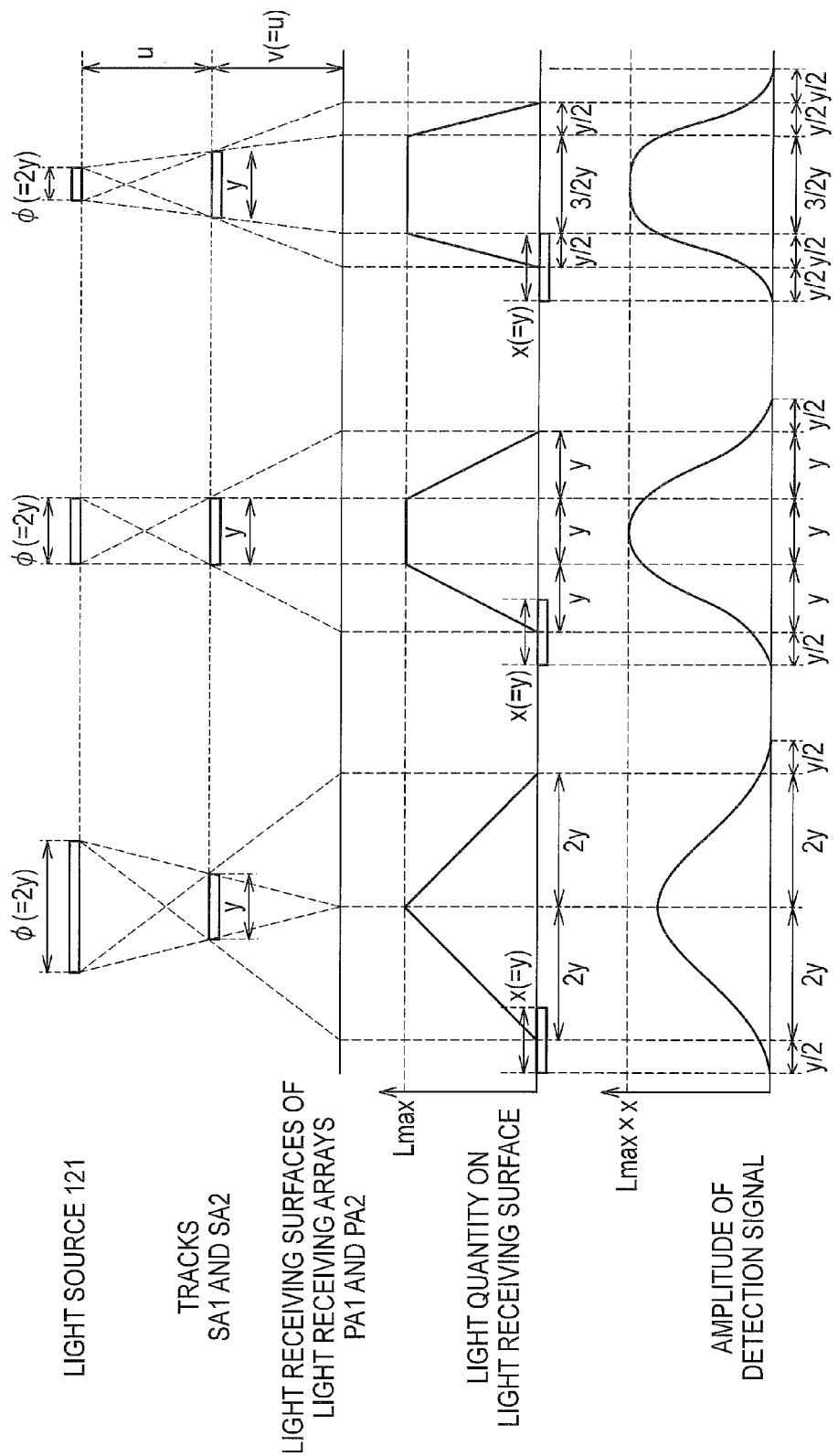
FIG. 7 is an explanatory diagram illustrating a relation among a light source width, an optical effecter width, a quantity of light on a light receiving surface, and an amplitude of a detection signal.

An example of an effect of improving the detection accuracy will be described using FIG. 7. FIG. 7 is a view illustrating a relation among a light source width φ, an optical effecter width y, a quantity of light on the light receiving surface, and an amplitude of the detection signal. Here, for convenience of description, the case in which u and v are equal to each other, and the light receiving element width x and the optical effecter width y are equal to each other will be described.

As in the relation illustrated in the left side of FIG. 7, when the light source width φ is not less than twice the optical effecter width y, the distribution of the quantity of light on the light receiving surface of the light receiving array PA1 or PA2 has a triangular shape. When the light source width φ is less than twice the optical effecter width y, the distribution of the quantity of light has a trapezoidal shape. As the light source width φ decreases, a width (corresponding to the light area LA above) of a flat region of the trapezoidal light-quantity distribution is increased, and widths of oblique regions located at opposite sides of the flat region is reduced. As in the relation illustrated in the middle of FIG. 7, when the light source width φ is equal to the optical effecter width y, the widths of the flat region and the two oblique regions of the light-quantity distribution each become y. As in the relation illustrated in the right side of FIG. 7, when the light source width φ is further reduced, the width of the flat region of the light-quantity distribution is further increased, and the widths of the oblique regions are further reduced.

Here, the amplitude of the detection signal which each light receiving element outputs becomes a value obtained by integrating the light-quantity distribution over an interval corresponding to an area in which the light receiving element is located. That is, if a maximum value of the light-quantity distribution (a height of a highest point of the light-quantity distribution is defined as Lmax, a maximum value of the amplitude of the detection signal is expressed by the product of Lmax and the light receiving element width x. Therefore, when the light receiving element width x is y, and when the width of the flat region of the light-quantity distribution is not less than y, the flat region is not less than the integral interval, and thus the amplitude of the detection signal reaches the maximum value expressed by Lmax×x. However, when the width of the flat region is less than x, the flat region is less than the integral interval, and thus the amplitude of the detection signal does not reach the maximum value. When the amplitude of the detection signal does not reach the maximum value, and when the amplitude is compared with a threshold and an absolute position signal is generated by binarization, accurate binarization may not occur, for instance, when a change in the threshold or a change in the light-quantity distribution occurs, and thus a decrease in the detection accuracy may be caused.

In the present embodiment, the light source width φ and the light receiving element width x are set to satisfy the aforementioned relational expression. In this example, the relational expression becomes φ≤y. That is, since the light source width φ is not more than the optical effecter width y, the width of the flat region of the light-quantity distribution can be not less than y as in the relation illustrated in the middle and right side of FIG. 7. Thereby, since the amplitude of the detection signal can reach the maximum value expressed by Lmax×x, the detection accuracy can be improved.

As illustrated in FIG. 7, when the light source width φ is equal to the optical effecter width y, the widths of the flat region and the two oblique regions of the light-quantity distribution each become y. As the light source width φ decreases, a proportion of the flat region in the light-quantity distribution is increased, and a waveform of the detection signal approximates to a rectangular form. At the right side of FIG. 7, as an example of the case in which the light source width φ is smaller than the optical effecter width y, the case in which the light source width φ is equal to the half of the optical effecter width y is illustrated. In this case, the width of the flat region of the light-quantity distribution becomes 3/2×y, and the widths of the two oblique regions each become y/2. In this way, the waveform of the detection signal approximates to the rectangular form. Thereby, when the amplitude is compared with the threshold and the absolute position signal is generated by binarization, a fluctuation range of the detection position, for instance, when the change in the threshold or the change in the light-quantity distribution occurs can be reduced. Accordingly, the detection accuracy can be further improved.

<4. Modification>

One embodiment of the present invention has been described with reference to the accompanying drawings. However, the scope of the technical idea described in the claims is not limited to the embodiment described herein. It will be apparent to those skilled in the art falling to the present embodiment that various modifications or alterations or a combination thereof can be contrived and implemented within the scope of the technical idea. Accordingly, the technique after these modifications or alternations or the combination thereof also, of course, falls within the scope of the technical idea.

(4-1. Undivided Arrangement of Incremental Light Receiving Array)

Figure 8:
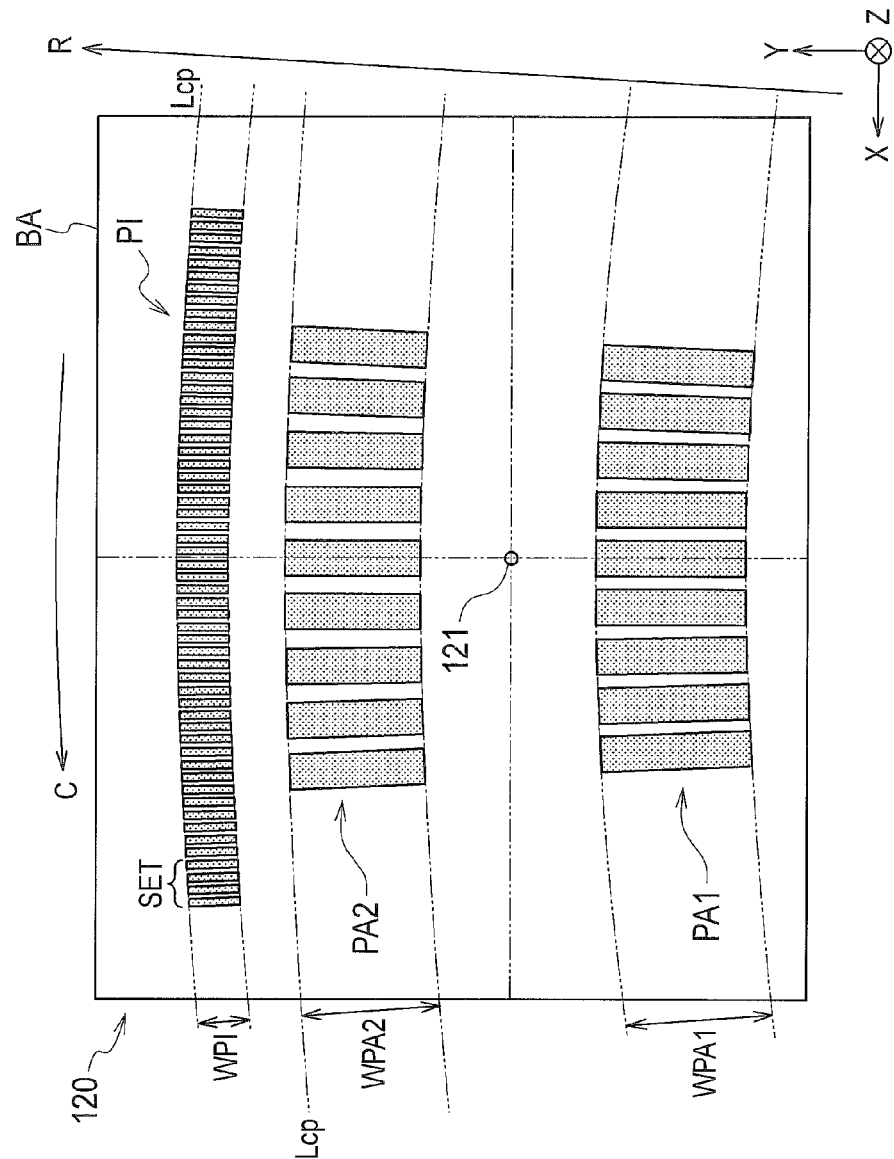
FIG. 8 is an explanatory diagram illustrating an optical module and a light receiving array according to a modification.

In the above embodiment, the case in which the light receiving array PI corresponding to the incremental pattern is divided and arranged across the light source 121 between the divided light receiving arrays in the measurement direction has been described. However, as illustrated in, for instance, FIG. 8, the light receiving array PI may be arranged as one light receiving array without being divided. In this example, the light receiving array PI is arranged at the side (outer circumference side) opposite to the central axis relative to the light source 121. The light receiving array PI is configured to receive light reflected by a track SI having an incremental pattern of a pitch P. Light receiving arrays PA1 and PA2 are the same as in the above embodiment. In this case, although not illustrated, three tracks are arranged on the disk 110 from inside to outside of a width direction R in the order of SA1, SA2, and SI.

With this configuration, in addition to the same effects as in the above embodiment, robustness against eccentricity of the disk 110 can be increased. That is, a detection error caused by the eccentricity of the disk 110 generally tends to depend on a radius of the track. The smaller the radius of the track, the greater the error. The greater the radius of the track, the smaller the error. Accordingly, when robustness against eccentricity of an incremental signal is increased, the light receiving array PI can be configured to be arranged at the side opposite to the central axis relative to the light source 121 as in the modification. Thereby, the track SI is arranged on the disk 110 at the outer circumference side, and the radius of the track SI can be increased. As a result, the detection error caused by the eccentricity of the light receiving array PI outputting the incremental signal can be reduced, and the robustness against the eccentricity can be increased. Further, the track SI can be secured at a great pitch.

In the aforementioned modification, the case in which the light receiving array PI is arranged at the side opposite to the central axis relative to the light source 121 has been described as an example. However, the light receiving array PI may be arranged at the central axis side (inner circumference side) relative to the light source 121. Further, the light receiving array PI may be arranged between the light receiving arrays PA1 and PA2. However, to obtain the effect of increasing the robustness against the aforementioned eccentricity, it is preferred to take the configuration of the above modification.

(4-2. Arrangement of Only One Absolute Light Receiving Array)

Figure 9:
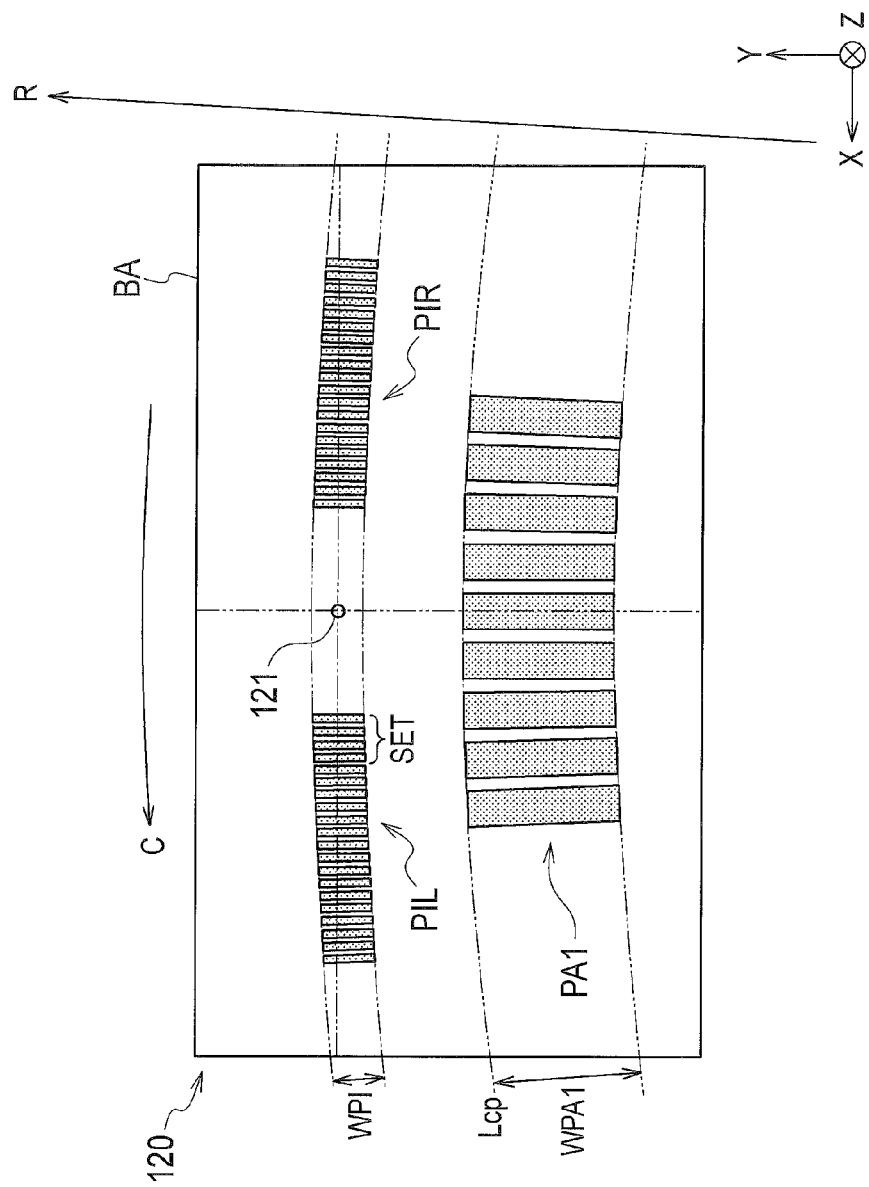
FIG. 9 is an explanatory diagram illustrating an optical module and a light receiving array according to another modification.

In the above embodiment, the encoder 100 is configured to have the two tracks SA1 and SA2 having the absolute pattern and to have the two light receiving arrays PA1 and PA2 adapted to receive the light reflected by these tracks SA1 and SA2, but it is not limited thereto. For example, as illustrated in FIG. 9, the optical module 120 may be configured to have only one light receiving array PA corresponding to the absolute pattern. In this example, the light receiving array PA is arranged at the central axis side (inner circumference side) relative to the light source 121, but it may be arranged at the side (outer circumference side) opposite to the central axis relative to the light source 121. The light receiving array PA has the same configuration as the light receiving array PA1 illustrated in FIG. 5. In this case, although not illustrated, two tracks are arranged on the disk 110 from inside to outside of the width direction R in the order of SA and SI. The track SA has the same configuration as the track SA2 illustrated in FIG. 4.

With this configuration, in addition to the same effects as in the above embodiment, the number of light receiving arrays can be reduced, and thus the optical module 120 can be made small. However, as described above, to prevent the detection accuracy of the absolute position from being reduced in the change area of the bit pattern, two light receiving arrays corresponding to the absolute pattern are preferably configured to be arranged like the above embodiment.

(4-3. Undivided Arrangement of Incremental Light Receiving Array and Arrangement of Only One Absolute Light Receiving Array)

Figure 10:
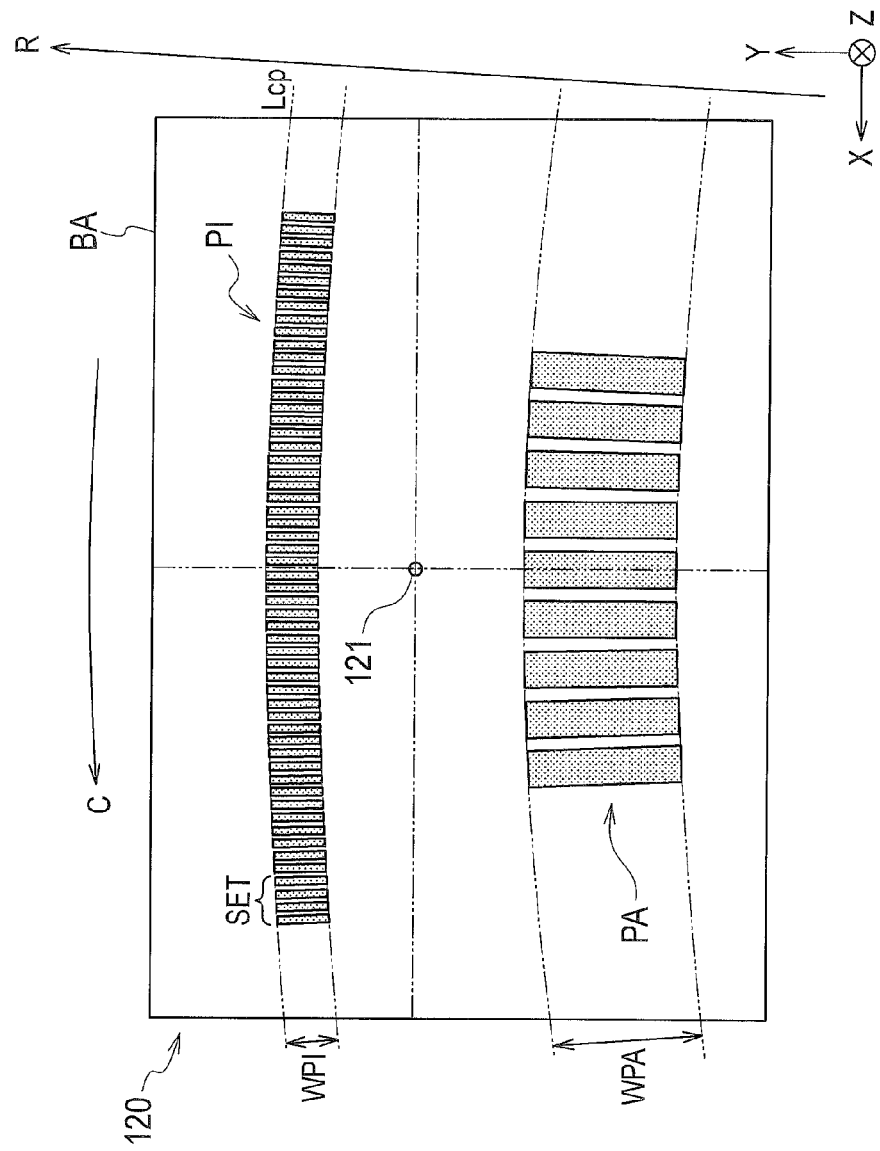
FIG. 10 is an explanatory diagram illustrating an optical module and a light receiving array according to still another modification.

In the above embodiment, the case in which the light receiving array PI corresponding to the incremental pattern is divided and arranged and the two absolute light receiving arrays PA1 and PA2 are provided has been described, but it is not limited thereto. For example, as illustrated in FIG. 10, the light receiving array PI may be configured to be arranged as one light receiving array without being divided, and only one light receiving array PA corresponding to the absolute pattern may be configured to be provided. In this example, the light receiving array PI is arranged at the side (outer circumference side) opposite to the central axis relative to the light source 121, and the light receiving array PA is arranged at the central axis side (inner circumference side) relative to the light source 121. In this case, although not illustrated, two tracks are arranged on the disk 110 from inside to outside of the width direction R in the order of SA and SI.

With this configuration, in addition to the same effects as in the above embodiment, the same effects as in the above modifications 4-1 and 4-2 are obtained. In the above modification, the case in which the light receiving array PI is arranged at the outer circumference side of the light source 121, and the light receiving array PA is arranged at the inner circumference side of the light source 121 has been described. However, the light receiving arrays PI may be arranged at the inner circumference side of the light source 121, and the light receiving arrays PA may be arranged at the outer circumference side of the light source 121. However, to obtain the effect of increasing the robustness against the aforementioned eccentricity, it is preferred to take the configuration of the above modification.

(4-4. Transmissive Encoder)

In the above description, the case in which the encoder is the so-called reflective encoder in which the light source and the light receiving arrays are arranged at the same side as the tracks of the disk 110 has been described as an example, but it is not limited thereto. That is, the encoder may be a so-called transmissive encoder in which the light source and the light receiving arrays are arranged across the disk 110 at the opposite side. In this case, the disk 110 may be formed such that each optical effecter of the tracks SA1, SA2, and SI functions as a transmissive slit, or the part other than the optical effecters are used as a rough surface by sputtering or are coated with a material having low transmittance. In the present modification, the light source 121 and the light receiving arrays PA1, PA2, PIL, and PIR are arranged to be opposite to each other with the disk 110 sandwiched therebetween. However, an optical module 120 in the present modification includes the light source and the light receiving arrays formed as separate elements in this way. Even in the case of using such a transmissive encoder, the same effects as in the above embodiment are obtained.

(4-5. Others)

Further, in the above embodiment, the case in which each of the light receiving arrays PA1 and PA2 has the nine light receiving elements and the absolute signal represent the 9-bit absolute position has been described. However, the number of light receiving elements may not be nine, and the number of bits of the absolute signal is not limited to nine as well. Further, the number of light receiving elements of the light receiving arrays PIL and PIR is not limited to, particularly, the number of the above embodiment.

Further, in the above embodiment, the case in which the encoder 100 is directly connected to the motor M has been described. However, the encoder may be connected to the motor via another mechanism such as a speed reducer or a rotating direction converter.

It should be understood by those skilled in the art that various modifications, combinations, sub-combinations and alterations may occur depending on design requirements and other factors insofar as they are within the scope of the appended claims or the equivalents thereof.

The invention claimed is:

1. An encoder comprising:
a track having optical effecters which are arranged to have an absolute pattern along a measurement direction and configured to reflect or transmit light;
a point light source configured to emit diffusion light to the track; and
a light receiving array having light receiving elements arranged along the measurement direction, and configured to receive light reflected or transmitted at the track, the light receiving elements falling within an area which is positioned corresponding to an area between the optical effecters and to which light reflected or transmitted at the track does not reach, wherein
a width of an emitting surface of the point light source in the measurement direction and a width of the light receiving elements in the measurement direction are set, so that the light receiving elements fall within the area which is positioned corresponding to the area between the optical effecters and to which light reflected or transmitted at the track does not reach, and wherein
when the width of the emitting surface in the measurement direction is $\phi$, a minimum width of the optical effecters in the measurement direction is y, the width of the light receiving elements in the measurement direction is x, a distance from the emitting surface to the optical effecters is u, and a distance from the optical effecters to the light receiving elements is v, the following relation is satisfied:

$$\phi \leq \{y \times (u+v) - u \times x\}/v;$$

and wherein
when the distance from the emitting surface to the optical effecters u is equal to the distance from the optical effecters to the light receiving elements y, the following is satisfied:

$$\phi \leq 2 \times y - x.$$

2. A motor with an encoder comprising:
a linear motor in which a movable element moves with respect to a stator, or a rotary motor in which a rotor moves with respect to an stator; and the encoder according to claim 1, configured to detect at least one of a position and a speed of the movable element or the rotor.

3. A servo system comprising:
a linear motor in which a movable element moves with respect to a stator, or a rotary motor in which a rotor moves with respect to an stator,
an encoder according to claim 1, configured to detect at least one of a position and a speed of the movable element or the rotor, and
a controller configured to control the linear motor or the rotary motor based on a result detected by the encoder.

4. An encoder comprising:
a track having optical effecters which are arranged to have an absolute pattern along a measurement direction and configured to reflect or transmit light;
a point light source configured to emit diffusion light to the track;
a light receiving array having light receiving elements arranged along the measurement direction, and configured to receive light reflected or transmitted at the track; and
means for falling the light receiving elements within an area which is positioned corresponding to an area between the optical effecters and to which light reflected or transmitted at the track does not reach, wherein a width of an emitting surface of the point light source in the measurement direction and a width of the light receiving elements in the measurement direction are set, so that the light receiving elements fall within the area which is positioned corresponding to the area between the optical effecters and to which light reflected or transmitted at the track does not reach, and wherein when the width of the emitting surface in the measurement direction is $\phi$, a minimum width of the optical effecters in the measurement direction is y, the width of the light receiving elements in the measurement direction is x, a distance from the emitting surface to the optical effecters is u, and a distance from the optical effecters to the light receiving elements is v, the following relation is satisfied:

$$\phi \leq \{y \times (u+v) - u \times x\}/v;$$

and wherein
when the distance from the emitting surface to the optical effecters u is equal to the distance from the optical effecters to the light receiving elements y, the following is satisfied:

$$\phi \leq 2 \times y - x.$$

* * * * *